May 12, 1942.   W. L. GROENE   2,282,720
CRANKSHAFT BROACHING LATHE
Filed Sept. 19, 1940   2 Sheets-Sheet 1
FIG. I.
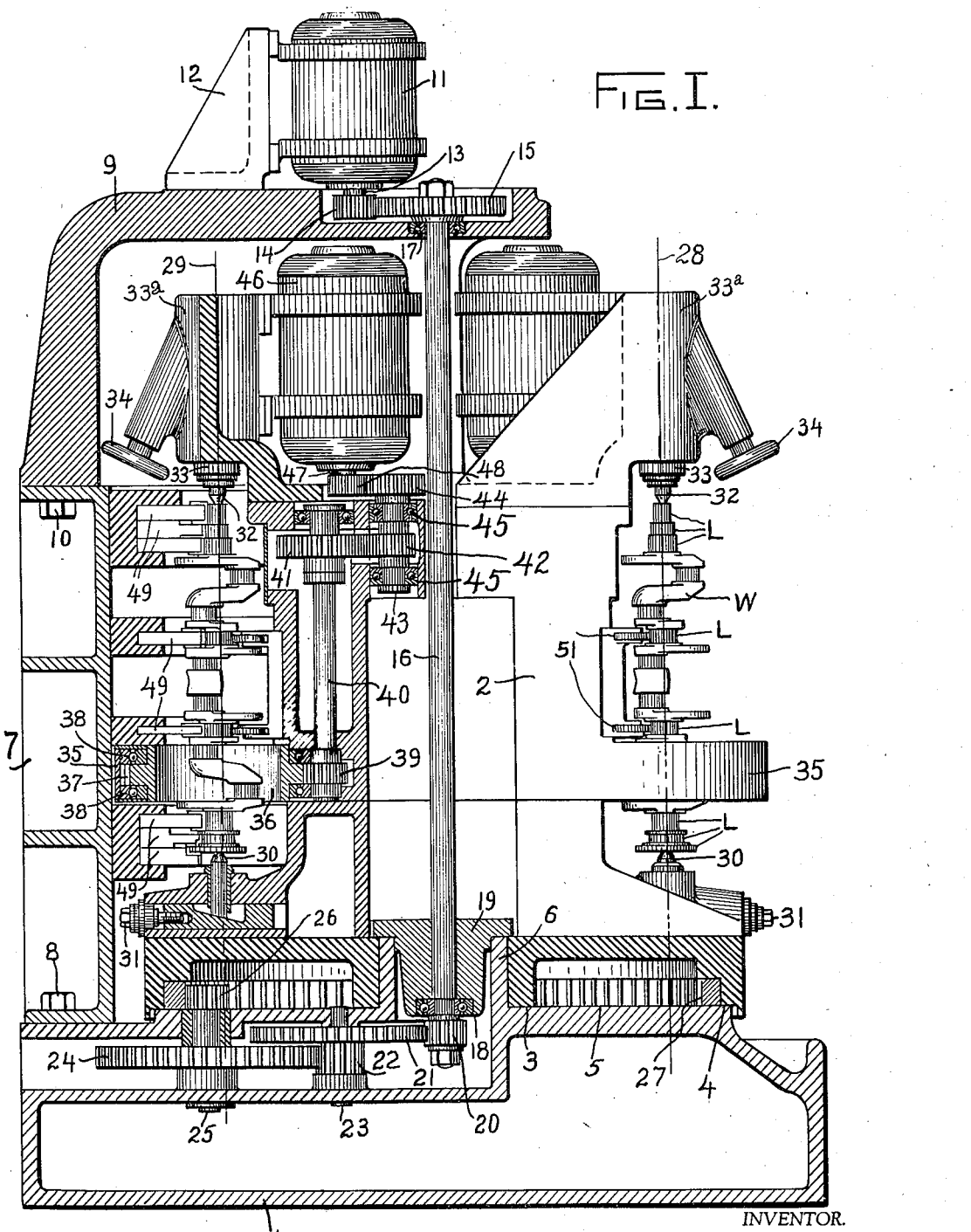
INVENTOR.
Willard L. Groene

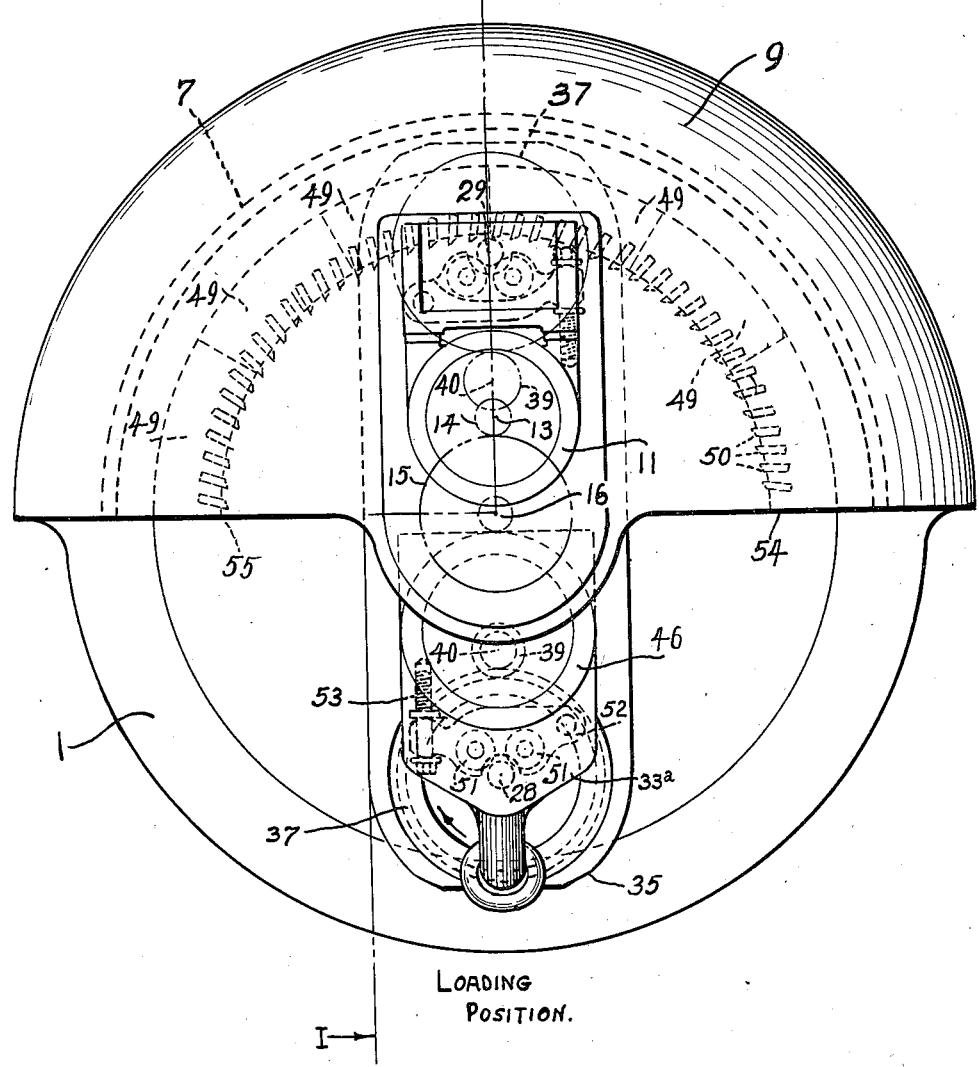

Patented May 12, 1942

2,282,720

UNITED STATES PATENT OFFICE 2,282,720

CRANKSHAFT BROACHING LATHE

Willard L. Groene, Cincinnati, Ohio, assignor to The R. K. Le Blond Machine Tool Company, Cincinnati, Ohio, a corporation of Delaware Application September 19, 1940, Serial No. 357,451

3 Claims. (Cl. 90—33)

This invention pertains to broaching lathes particularly adapted to the simultaneous broaching of all of the line bearings of crankshafts at one time. More especially this invention pertains to a multiple spindle type of broaching machine in which a plurality of work spindles are continually being passed over a series of fixed broaching cutters while other of said spindles are being brought to the work loading station where work is taken out and new unfinished work is placed in the machine as it continues to carry the work in the work spindles while rotating around against the broaching cutters.

One object of the present invention is to provide means for chucking and rotating a crankshaft intermediate its ends and for supporting the end portions of said crankshaft while exposing all of its line bearings for broaching operations and then to present the crankshaft, while so chucked and rotated, to a broaching cutter carried in the frame of the machine and to carry the crankshafts along over these broaches until all of the line bearing portions of said crankshaft have been broached to the desired finished dimensions.

Another object of this invention is to provide in a broaching lathe a continuously rotatable carrier member having a series of center drive work spindles each comprising center drive chucking means and centering means for supporting the ends of a work crankshaft and to continually move this work carrier over a series of circular broaches fixed in the frame of the machine so as to continuously machine the line bearing portions of said crankshaft to desired dimensions while at the same time providing an accessible loading station where work may be placed in or removed from each of the spindles of said carrier while the broaching operation is being undertaken at other of said work spindles during the continuous rotary movement of the carrier member.

Further objects and features of this invention will appear from the detailed description of the drawings in which:

Figure I is a vertical transverse section through a typical embodiment of my invention in a vertical multiple spindle continuous crankshaft line bearing broaching machine shown on the line I—I of Figure II.

Figure II is a plan view of the machine illustrated in Figure I.

The machine comprises a base 1 upon which is rotatively mounted the work spindle carrier 2 which rests on bearing surfaces 3 and 4 on the surface 5 of the base 1 and is also held in proper oriented position centrally of the base by means of upwardly projecting trunnion 6. Also mounted on the base is the semi-circular broach carrying frame member 7 suitably bolted to the base by screws 8 and on top of which is carried the housing 9 appropriately secured to this broach carrying member 7 by suitable screws 10. On this member 9 is carried the work carrier rotating motor 11 suitably mounted on the bracket 12 fixed to the member 9 having a shaft 13 on which is fixed the pinion 14 which in turn drives the gear 15 fixed on the centrally located drive shaft 16 which is journaled in a suitable bearing 17 in the housing 9 and supported and journaled at its lower end in a suitable bearing 18 carried in a suitable bracket 19 fixed to the trunnion member 6.

On the lower end of this shaft 16 is fixed the driving pinion 20, Figure I, which in turn drives the gear 21 of compound gear 21—22 suitably journaled on a stud 23 fixed in base 1 of the machine. The gear 22 in turn drives the large gear 24 fixed on the stub shaft 25 journaled in suitable bearings in the base 1 and upon which shaft is fixed the pinion 26 which drives in the large internal ring gear 27 fixed to the bottom of the work spindle carrier 2 so that as the motor 11 operates it rotates the work carrier continuously upon the base about the trunnion 6 at a relatively slow feeding rate commensurate with the machining operation to be undertaken.

On the spindle carrier 2 are provided a plurality of rotatable work supporting structures or work spindles, in this particular instance, two work spindles whose axes are designated 28 and 29. Each of these spindles which may be considered generally as 28 and 29 comprise centers 30 for supporting the lower or flange end of the crankshaft in this instance, and suitable means 31 for adjusting these centers in proper relationship to the work piece when placed on the spindle. At the upper end of the work spindle is also provided a suitable center 32 carried in a suitably axially movable barrel 33 in the tailstock bracket 33a which may be adjusted by the usual means for such purpose such as the hand wheel 34 to properly engage the centers 32 with the upper end of the crankshaft W.

Also on the work spindle is provided a center drive ring gear chucking device indicated generally at 35 having a ring gear 36 containing suitable chucking mechanism of a character for example as set forth in Patent #2,030,020 for gripping the crankshaft and supporting it while rotating it about the spindle axis 28 or 29. These center drive ring gears have gear teeth 37 cut in their peripheries and are journaled in suitable bearings 38 in the portion 35 of the tool carrier member 2 and are driven by means of a pinion 39 suitably fixed on the vertical drive shaft 40 appropriately journaled in suitable bearings in the tool carrier member 2. This shaft 40 has fixed on its upper end, Figure I, a gear 41 which in turn is connected to the pinion 42 on the stub shaft 43 which shaft has a gear 44 mounted on its upper end, the shaft being journaled in suitable bearings 45 in the work spindle carrier member 2 and the gear 44 being driven by the spindle driving and rotating motor 46 through its shaft 47 and pinion 48, the motor 46 for each spindle being appropriately mounted on the tailstock brackets. Thus by energizing or deenergizing the respective motors 46 for the work spindles 28 or 29 the work spindles may be rotated at cutting speed or stopped as desired when at the loading station.

On the semi-circular frame member 7 is provided a series of broaching cutters 49 having cutting teeth 50 appropriately formed for simultaneously affecting cutting action on all of the line bearing portions L of the crankshafts W as the carrier 2 revolves the rotating work spindles over these cutters.

In addition to the center drive chucking mechanism 35 there is provided a series of back up steady rest rollers 51 adjustably carried in a suitable pivotally mounted bracket 52 carried by the work spindle carrying member 2 and which may be adjusted relative to the work spindle axes by suitable adjusting means 53, best seen in Figure II so that these rollers may be properly contacted with the line bearings to be broached in cases where extremely heavy cutting is to be done.

The operation of the machine is substantially as follows:

Work may be placed in and removed from a work spindle as it moves from the end of the broaches at the point 54 until it again re-engages the broaches at the point 55, Figure II, and this travel from the point 54 to the point 55 as affected by the rotation of the work spindle carrier 2 by the motor 11 is known as the loading position. Thus as the work spindle 28, for example, leaves the point 54 the operator unloads the crankshaft W from the spindle and replaces a new unfinished crankshaft before the spindle ultimately arrives at the point 55. During the time the work spindle 28 is travelling from the point 54 to the point 55 the respective spindle drive motor 46 for this work spindle is cut off and no power for rotating the work spindle is applied by this motor during this time. As soon as the crankshaft is about to engage the broaches at the point 55 the motor 76 is again re-energized to rotate the spindle for again affecting the necessary cutting rotation speed for this work spindle while it continues around the broaching cutters 49 while the spindle 29 again emerges into the loading position where the finished work piece is taken from it and a new work piece replaced in it for its continuation of the cycle around the broaching cutters 50. Thus in this arrangement we have a machine with a multiplicity of work spindles for carrying a plurality of crankshafts with their line bearings exposed for broaching operations thereon and in which the work spindle carrier, having the center drive chucking mechanism, continuously moves over a broaching medium, there being no loss of machining time during the loading and unloading of the work spindles as they pass out of broaching cutters to the loading position and back again to the broaching cutters. We thus have a center drive type of vertical broaching lathe adapted to the continuous production of finished line bearings simultaneously on the crankshaft as they are continuously loaded in and unloaded from the machine.

Having thus fully set forth and described my invention what I claim as new and desire to secure by United States Letters Patents is:

1. In a broaching lathe, a frame, a rotatable work carrier mounted on said frame, means for continuously actuating said work carrier, a series of work spindles provided on said carrier each comprising a pair of opposed centers for rotatively supporting the ends of a work piece to be machined in said lathe, a center drive work spindle mounted on said carrier and located between said centers, chucking means mounted on said work carrier intermediate said work spindle and adapted to receive said work piece, independent means to rotate said chucking means and work piece, a series of broaching tools mounted on said frame having their cutting teeth arranged in the path of travel of work pieces in said spindles as effected by rotation of said work carrier, said broaching means being located between said centers and said center drive work spindles.

2. In a multiple spindle broaching lathe, a frame, a rotatable work carrier mounted on said frame, means for continuously actuating said carrier, a series of work spindles on said carrier comprising centers for rotatively supporting the ends of a work piece, chucking means mounted on said work carrier intermediate said work spindle and adapted to receive said work piece, independent means to rotate said chucking means and work piece, a series of broaching cutters arranged in the path of travel of said work spindles defined by the movement of said rotatable work carrier, said broaching means being positioned each side of said center drive chucking mechanism and between said centers, and means for rotating said work spindles at cutting speed.

3. In a multiple spindle continuously operating broaching lathe, a frame, a rotatable work carrier mounted on said frame, means for continuously rotating said carrier at a feeding speed, a series of work spindles on said carrier comprising a pair of opposed centers for rotatively supporting the ends of a work piece to be broached in said lathe, chucking means mounted on said work carrier intermediate said work spindle and adapted to receive said work piece, independent means to rotate said chucking means and work piece, broaching means, having their cutting teeth arranged in the path of travel as defined by the movement of said work spindles effected by rotation of said work carrier, fixed on said frame and located intermediate said centers and each side of said center drive chucking mechanism.

WILLARD L. GROENE.